(12) United States Patent
Hurley et al.

(10) Patent No.: US 8,718,428 B2
(45) Date of Patent: May 6, 2014

(54) MULTIFIBER SUBUNIT CABLE

(75) Inventors: William C. Hurley, Hickory, NC (US); Samuel D. Navé, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 139 days.

(21) Appl. No.: 13/491,122

(22) Filed: Jun. 7, 2012

(65) Prior Publication Data

US 2012/0243841 A1    Sep. 27, 2012

Related U.S. Application Data

(63) Continuation of application No. PCT/US2010/058717, filed on Dec. 2, 2010.

(60) Provisional application No. 61/286,212, filed on Dec. 14, 2009.

(51) Int. Cl.
*G02B 6/44* (2006.01)
*G02B 6/04* (2006.01)
*B29C 47/02* (2006.01)

(52) U.S. Cl.
CPC .............. *G02B 6/4401* (2013.01); *B29C 47/02* (2013.01)
USPC ........... 385/112; 385/109; 385/110; 385/113; 264/1.28

(58) Field of Classification Search
CPC ...... G02B 6/441; G02B 6/443; G02B 6/4429; G02B 6/4479; B29C 47/02
USPC ............... 385/100–114; 264/1.24, 1.28, 1.29; 427/163.2
See application file for complete search history.

(56) References Cited

U.S. PATENT DOCUMENTS

| | | | |
|---|---|---|---|
| 4,696,541 A | 9/1987 | Haag et al. | 350/96.23 |
| 4,906,067 A | 3/1990 | Mayr et al. | 350/96.23 |
| 5,982,965 A | 11/1999 | Cheron et al. | 385/100 |
| 6,205,277 B1 * | 3/2001 | Mathis et al. | 385/106 |
| 6,389,204 B1 * | 5/2002 | Hurley | 385/102 |
| 6,434,307 B1 * | 8/2002 | Church | 385/114 |
| 7,266,273 B2 * | 9/2007 | Bonicel et al. | 385/100 |
| 8,559,778 B2 | 10/2013 | Hurley et al. | 385/110 |
| 2002/0126967 A1 * | 9/2002 | Panak et al. | 385/101 |
| 2002/0197030 A1 * | 12/2002 | McAlpine et al. | 385/103 |
| 2003/0156805 A1 * | 8/2003 | Shi | 385/100 |
| 2004/0120665 A1 * | 6/2004 | Hurley et al. | 385/106 |
| 2011/0243514 A1 | 10/2011 | Nave | 385/110 |

FOREIGN PATENT DOCUMENTS

| | | | | |
|---|---|---|---|---|
| DE | 4408548 A1 | 12/1995 | | G02B 6/44 |
| JP | 07270651 A * | 10/1995 | | G02B 6/44 |

OTHER PUBLICATIONS

Patent Cooperation Treaty International Search Report, Application No. PCT/US2010/058717, Apr. 18, 2011, 4 pages.
Patent Cooperation Treaty International Preliminary Report on Patentability, Application No. PCT/US2010/058717, Jun. 19, 2012, 5 pages.

* cited by examiner

*Primary Examiner* — Uyen-Chau N Le
*Assistant Examiner* — Michael Mooney
(74) *Attorney, Agent, or Firm* — Russell S. Magaziner

(57) ABSTRACT

Micromodule subunit cables are constructed to allow for ease of identification between optical fibers in differing groups of optical fibers. In one cable, a first group of fibers is located within a first subunit while a second group of fibers is located within a second subunit, both subunits being enclosed in a cable jacket.

20 Claims, 2 Drawing Sheets

MULTIFIBER SUBUNIT CABLE

PRIORITY APPLICATION

This application is a continuation of International Application No. PCT/US10/58717 filed Dec. 2, 2010, which claims the benefit of priority to U.S. Provisional Application No. 61/286,212, filed Dec. 14, 2009, both applications being incorporated herein by reference.

TECHNICAL FIELD

The present disclosure relates to optical cables with features that provide easy access to and/or segregation between optical fibers in different groups of optical fibers.

BACKGROUND

Data centers require high density for optical components to compensate for limited space. MTP connectors are used in data centers because they allow for high density, as well as high efficiency. 24 fiber MTP connectors, for example, provide for high density optical connectivity. Typical MTP connectors are designed for a cable of circular profile and an outer diameter of 3.3 mm or less.

During cable access and connectorization of 24 fiber cables, the installer must be able to distinguish fibers 1-12 in the first group of fibers from fibers 13-24 in the second group. There are, however, only twelve colors used in the industry standard color coding scheme. One method to distinguish the two groups fibers is to provide fibers 13-24 with marking indicia, such as dashed lines, to distinguish them from fibers 1-12. Fiber coloring inks are applied and cured at extremely high speeds, however, and applying dashes or other indicia slows production line speed as well as increasing costs of manufacture.

Another method of distinguishing between fiber groups is to bundle fibers 13-24 in the second group with a thread binder that is wrapped around the bundle of fibers. The binder can untwist, however, when the installer removes the outer jacket of the cable. When the binder untwists, the installer loses traceability between the two groups of 12 colored fibers.

Conventional cables may also be difficult to connect to MTP connectors, or have bend characteristics that render the cables difficult to route through data center space.

SUMMARY

According to one aspect of the present embodiments, a subunit cable comprises a subunit cable jacket and at least two subunits located within the cable jacket. Each subunit comprises a buffer tube and a plurality of optical fibers disposed within the buffer tube, wherein the subunits are compressed in the subunit cable jacket so that at least one of the subunits has a cross-section with a minor outside dimension and a major dimension, and the ratio of the minor outside dimension to the major outside dimension is less than 0.9. In an uncompressed state, the subunits can have a generally circular cross-section, and while in a compressed state, the subunits can have a generally oval cross-section.

According to another aspect of the present embodiments, a method of making a subunit cable comprises providing at least two subunits located within the cable jacket, each subunit comprising a buffer tube and a plurality of optical fibers disposed within the buffer tube, compressing the subunits so that at least one of the subunits has a cross-section with a minor outside dimension and a major outside dimension, and the ratio of the minor dimension to the major dimension is less than 0.9, and extruding a subunit cable jacket around the subunits, wherein the subunits are compressed within the subunit cable jacket. In an uncompressed state, the subunits can have a generally circular cross-section, and while in a compressed state, the subunits can have a generally oval cross-section.

The accompanying drawings are included to provide a further understanding, and are incorporated in and constitute a part of this specification. The drawings illustrate one or more embodiment(s), and together with the description serve to explain principles and operation of the embodiments.

BRIEF DESCRIPTION OF THE FIGURES

The present embodiments are explained in more detail below with reference to figures which show the exemplary embodiments.

DETAILED DESCRIPTION

Figure 1:
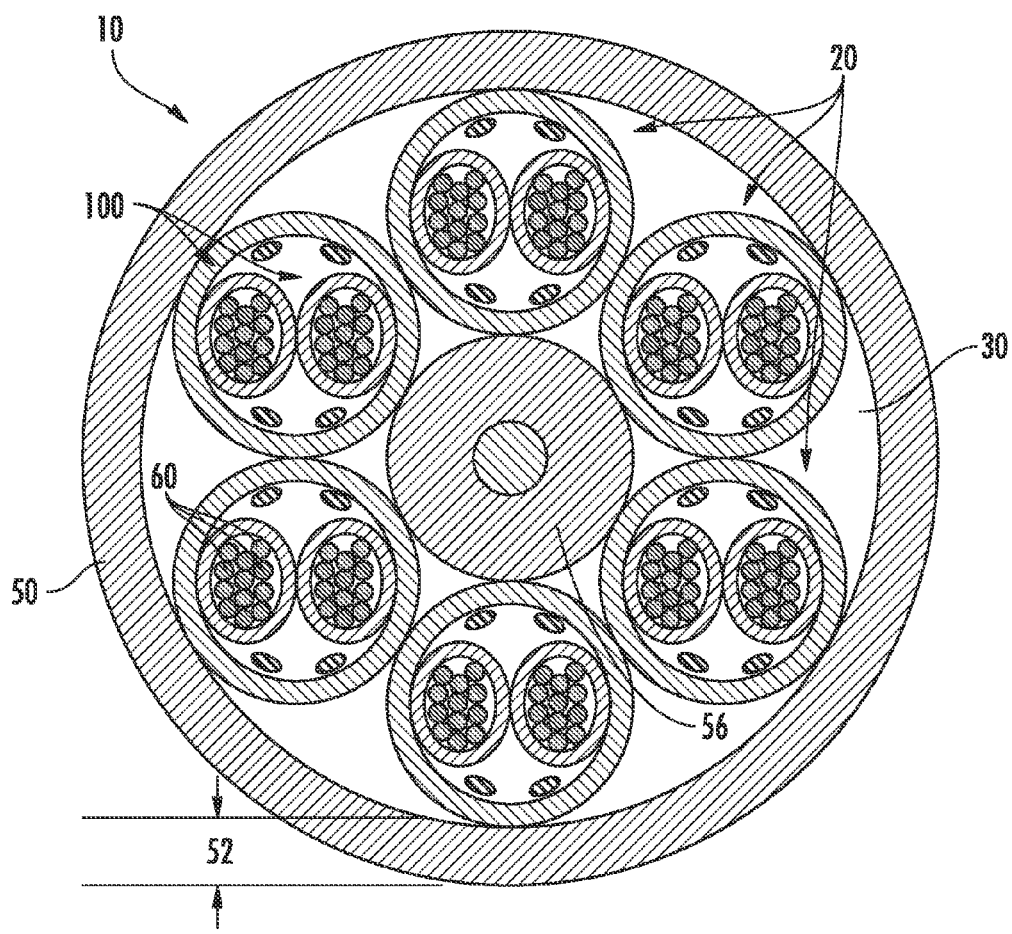
FIG. 1 is a cross section of a micromodule cable according to a first embodiment.

FIG. 1 is a cross section of a micromodule cable 10 according to a first embodiment. The optical cable 10 comprises a plurality of micromodule subunit cables 20 disposed in an interior 30 of the micromodule cable 10. The interior 30 of the cable 10 is defined by the cable's outer jacket 50. The outer jacket 50 can be formed from, for example, a flame-retardant polymer material, and has a thickness 52. A strength element 56 may be disposed in the interior 30 and contacting the micromodule cable subunits 20. Each micromodule subunit cable 20 includes a plurality of optical fiber waveguides 60.

In the illustrated embodiment, the micromodule cable 10 has six micromodule subunit cables 20, with each micromodule subunit cable 20 including 24 optical fiber waveguides 60. Other numbers of subunit cables 20 and optical fibers 60 can be employed for various applications, however. The micromodule cable 10 and the micromodule subunit cables 20 have generally circular cross-sections, although other cross-sections may be used. The diameters of the certain circular cross-sections are described to in this specification. It is understood that the illustrated cables and subunit cables will not have perfectly circular cross sections, and that any citations of outside diameters may represent an average diameter of a generally circular cross section.

Figure 2:
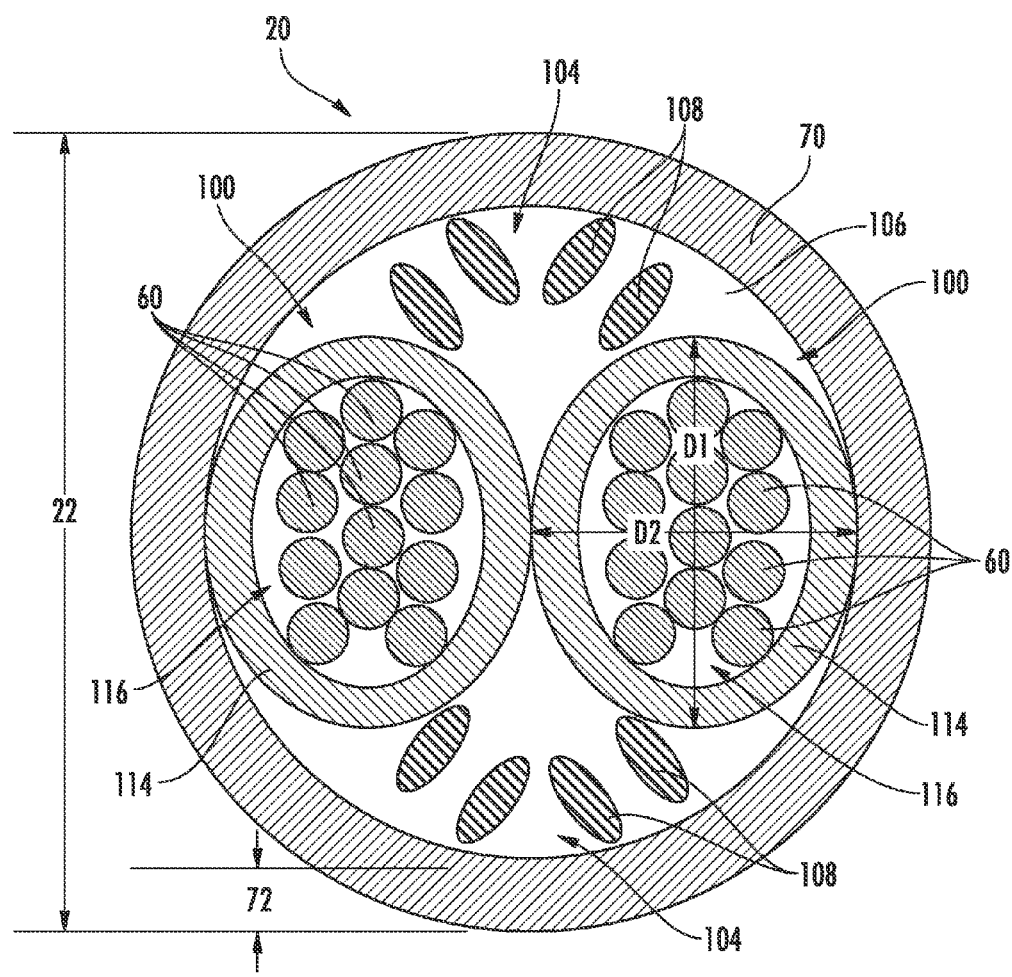
FIG. 2 is a cross section of one of the micromodule subunit cables used in the cable of FIG. 1.

FIG. 2 is a cross section of one of the exemplary micromodule subunit cables 20 illustrated in FIG. 1 having an outside diameter 22. Each micromodule subunit cable 20 has a subunit cable jacket 70 of thickness 72 that encloses two subunits 100. A strain-relief component 104 may be disposed within an interior 106 of the cable jacket 70 and surrounding the subunits 100. The strain-relief component 104 may be, for example, a layer of longitudinally-extending tensile yarn strands 108 that extend along the length of the micromodule subunit cable 20 for absorbing a tensile loads on the cable.

According to one aspect of the first embodiment, the optical fibers 60 are arranged in two subunits 100 within the subunit cable jacket 70. The subunits 100 each have a subunit cable jacket or buffer tube 114 that encloses a group of optical fibers 60 in the subunit interior 116. The subunits 100 segregate the optical fibers 60 so that they can be easily identified. For example, each of the optical fibers 60 in one subunit 100 may have a corresponding optical fiber 60 in the other subunit 100 that is identical in appearance and/or color. There is no need to provide identifying indicia (e.g. stripes) on the optical fibers 60 of either of the subunits 100. Also according to the disclosed embodiment, there is no need to enclose one fiber group in a thread binder. In one embodiment, each subunit 100 includes twelve optical fibers 60 in a 12 color sequence of blue, orange, green, brown, slate, white, red, black, yellow, violet, rose, and aqua.

According to one aspect of the first embodiment, the subunits 100 can be compressed against each other and against the interior of the subunit cable jacket 70. Under these compressive loads, the cross-sections of the subunits 100 are deformed from what might otherwise be a generally circular cross-section. Compressing the subunits 100 so that they have the generally oval cross-section shown in FIG. 2 allows for a smaller diameter subunit cable 20. The degree of deformation of the subunits 100 can be measured by comparing the largest, or major outside width dimension D1 of a subunit with its smallest, or minor outside width dimension D2. According to one aspect of the present embodiment, the ratio of minor dimension D1 to major dimension D2 (i.e., D1/D2) can be 0.9 or less. According to another aspect, the ratio of minor dimension to major dimension can be 0.8 or less, or even 0.7 or less under higher compressive loads.

The subunits 100 in the subunit cable 20 can be, for example, standard 1.6 mm nominal (before compression) outside diameter modules used in current EDGE™ data center cables available from Corning Cable Systems, Inc. Smaller subunits 100 could be used; it is possible to make subunits 100 with buffer tube 114 wall thicknesses of about 0.12 mm, resulting in subunit nominal (before compression) outside diameter of about 1.45 mm. When incorporating two standard 1.6 mm subunits 100 in a cable 20 with a nominal cable diameter 22 of less than 3.5 mm, the subunits 100 are compressed going through the extrusion tip. To achieve an outside diameter 22 of 3.1 mm, the subunits 100 are each compressed by about 0.3 mm along the axis of the minor dimension D1, resulting in the generally oval shape with a minor dimension D1 of about 1.3 mm and a major dimension D2 of about 1.9 mm, with the subunit cable jacket thickness 72 of 0.25 mm. The subunits 100 and strength members 104 are processed longitudinally without stranding. However, it is possible to strand the subunits 100 and strength members 104.

A 24 fiber subunit cable 20 can have a nominal diameter 22 of about, for example, 3.3 mm or less, and can be less than or equal to 3.1 mm Smaller cable diameters are desirable because they reduce congestion on equipment racks in data center applications. Typical MTP connectors are designed for a cable of circular profile and an outer diameter of 3.3 mm or less, so the small cross-sections possible with the present embodiments are suitable for conventional connectorization. The dual subunit 100 design segregates the fibers 60 which makes it faster and easier for installers to identify the separate groups of 12 fibers and to keep them segregated during cable access and connectorization. With this design there is no entanglement between the fibers and the strain-relief component strands 108.

Subunit cables 20 according to the present embodiments can also have exceptional skew performance. The fibers 60 in each subunit 100 can meet the 3.75 ps/m requirement for high data rate applications. Also since the subunit 100 are compressed together in the tip during cabling, they act together as one unit so the skew between the 12 optical fibers 60 in each subunit, as well as between all 24 fibers, is exceptionally low.

Example 1

A micromodule subunit cable 20 as shown in FIG. 2 includes two subunits 100 of twelve optical fiber waveguides 60. Each subunit 100 includes fibers in the 12-color sequence: blue, orange, green, brown, slate, white, red, black, yellow, violet, rose, and aqua. For each fiber 60 in one subunit 100, there is a corresponding fiber 60 in the other subunit 100 of identical appearance, including color or external pattern or identifying indicia, if any. In this example, the fibers 60 are of solid color with no identifying indicia. The cable diameter 22 is about 3.1 mm, and the thickness 72 of the jacket 70 is about 0.25 mm. Before integration into the subunit cable 20, the outside diameter of the buffer tube 114 is about 1.6 mm, and the thickness of the buffer tube 114 is about 0.20 mm. The fibers 60 are bare, non-tight buffered fibers of about 0.250 mm diameter and are sold as ClearCurve® multimode fiber available from Corning Incorporated. The jacket 70 and the buffer tube 114 are made from a flame-retardant PVC available from AlphaGary Corporation. The strain-relief component 104 comprises KEVLAR® aramid tensile yarns disposed around the subunits 100. From 2-8 strands of tensile yarn are used. The subunit cable 20 is connectorized to MTP connectors.

The present cable embodiments may utilize tensile yarns as tension relief elements that provide tensile strength to the cables. A preferred material for the tensile yarns is aramid (e.g., KEVLAR®), but other tensile strength materials could be used. For example, high molecular weight polyethylenes such as SPECTRA® fiber and DYNEEMA® fiber, Teijin Twaron® aramids, fiberglass, etc. may also be used. The yarns may be stranded to improve cable performance.

The components of the cable 10, such as the micromodule cables 20, can be constructed of selected materials of selected thicknesses such that the cable 10 achieves plenum burn ratings according to desired specifications. The micromodule subunit cables 20 can also be constructed so that they are relatively robust, such that they are suitable for field use, while also providing a desired degree of accessibility. For example, the micromodule cables 20 according to the present embodiment can be constructed with thicker cable jackets 70 which provide sufficient protection for the fibers such that the subunit cables 20 may be used as furcation legs.

The outer jacket 50, the subunit cable jackets 70, and the buffer tubes 114 can be formed from fire-retardant materials to obtain a desired plenum burn rating. For example, highly-filled PVCs of a specified thicknesses can be used to form these components. Other suitable materials include PVDF, CPE, and low smoke zero halogen (LSZH) materials such as flame retardant polyethylene (FRPE). One plenum burn standard is the National Fire Protection Standards (NFPA) 262 burn test. NFPA 262 prescribes the methodology to measure flame travel distance and optical density of smoke for insulated, jacketed, or both, electrical wires and cables and optical fiber cables that are to be installed in plenums and other spaces used to transport environmental air without being enclosed in raceways. Other materials include nylons, polyesters, PE, PP, and fluoropolymers such as FEP, PTFE, ETFE, etc. could be used dependent on burn requirements.

In one particular set of parameters, cables according to the present embodiments may contain from four to twelve optical fibers within each subunit 20. The dimensions of the subunits 20 may be adjusted based on the number of fibers within the module. The fibers 60 may be loosely disposed within the subunits 20 in an essentially parallel array. The fibers 60 may be coated with a thin film of powder, such as chalk or talc, which forms a separation layer that prevents the fibers from sticking to the molten sheath material during extrusion. The cable 10 may be further encased in an interlocking armor for enhanced crush resistance.

The subunit cable 20 can be manufactured by first producing subunits 100. The subunits 100 can be manufactured by providing optical fibers 60 and extruding the buffer tubes 114 around the fibers 60. The subunits 100 are then provided along a process direction, and the cable jacket 70 is extruded over subunits 100. The subunits 100 are compressed as the jacket 70 is extruded. If present, the aramid fibers 108 of the strength component 104 are also provided within the cable jacket 70 during extrusion of the cable jacket.

The subunit cables 20 could be made in higher fiber counts by compressing more subunits 100 together. For example, a 48-fiber subunit cable could be made by compressing four subunits 100 together and adding aramid and jacket over the modules. The 48f cable could have an OD of about 5 mm or less.

The number of fibers in the subunits 100 can be adjusted to meet specific transmission schemes. For example, a 40 Gb/s parallel optics transmission system could use four fibers operating a 10 Gb/s for transmission and another four fibers for receiving. Thus subunits 100 can include four fibers each.

According to one aspect of the present embodiments, the cables may have nonpreferential bend characteristics, of relatively small diameter, and utilize non-tight buffered fiber groupings. These features allow the cables to be easily attached to MTP connectors, and also allow for easy routing of the fibers once in the MTP body.

Many modifications and other embodiments of the present invention, within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like.

What is claimed is:

1. A subunit cable, comprising:
   a subunit cable jacket; and
   at least two subunits located within the cable jacket, each subunit comprising:
      a buffer tube; and
      a plurality of optical fibers disposed within the buffer tube; wherein
   the subunits are compressed in the subunit cable jacket so that at least one of the subunits has a cross-section with a minor outside dimension and a major dimension, and the ratio of the minor outside dimension to the major outside dimension is less than 0.9, and
   wherein a nominal outside diameter of the subunit cable is less than 3.5 mm.

2. The cable of claim 1, wherein the ratio of minor outside dimension to major outside dimension is less than 0.8.

3. The cable of claim 1, wherein the ratio of minor outside dimension to major outside dimension is less than 0.7.

4. The cable of claim 1, further comprising a strain-relief component disposed within the cable jacket, the strain-relief component comprising a plurality of longitudinally extending tensile yarns.

5. The cable of claim 4, wherein portions of the tensile yarns contact the subunits and the subunit cable jacket.

6. The cable of claim 1, wherein the cable jacket comprises a PVC and the buffer tubes comprise a PVC.

7. The cable of claim 1, wherein the at least two subunits comprises a first subunit and a second subunit, and wherein for each optical fiber in the first subunit, there is a corresponding optical fiber in the second subunit of identical color and appearance.

8. The cable of claim 7, wherein the first subunit comprises twelve optical fibers and the second subunit comprises twelve optical fibers.

9. The cable of claim 1, wherein a nominal outside diameter of the cable is less than 3.3 mm.

10. The cable of claim 1, wherein the compressed subunits have a generally oval cross section.

11. A micromodule cable comprising a polymeric outer jacket; a strength element; and a plurality of cables according to claim 1 located within the outer jacket.

12. A method of making a subunit cable, comprising:
    providing at least two subunits along a process direction, each subunit comprising a buffer tube and a plurality of optical fibers disposed within the buffer tube;
    compressing the subunits so that at least one of the subunits has a cross-section with a minor outside dimension and a major outside dimension, and the ratio of the minor dimension to the major dimension is less than 0.9; and
    extruding a subunit cable jacket around the subunits, wherein the subunits are compressed within the subunit cable jacket,
    wherein the at least two subunits comprises a first subunit and a second subunit, wherein for each optical fiber in the first subunit, there is a corresponding optical fiber in the second subunit of identical color and appearance,
    wherein the first subunit comprises twelve optical fibers and the second subunit comprises twelve optical fibers, and wherein a nominal outside diameter of the cable is less than 3.5 mm.

13. The method of claim 12, wherein the ratio of minor outside dimension to major outside dimension is less than 0.8.

14. The method of claim 12, further comprising paying off a tensile yarn strain-relief component, wherein the cable jacket is extruded around the strain-relief component, and wherein the tensile yarns contact the subunits and the subunit cable jacket.

15. The method of claim 12, wherein the first subunit comprises twelve optical fibers and the second subunit comprises twelve optical fibers, and wherein a nominal outside diameter of the cable is less than 3.3 mm.

16. The method of claim 12, wherein the cable jacket comprises a PVC and the buffer tubes comprise a PVC.

17. The method of claim 12, wherein the compressed subunits have a generally oval cross section.

18. A subunit cable, comprising:
    a subunit cable jacket; and
    at least two subunits located within the subunit cable jacket, each subunit comprising:
       a buffer tube; and
       a plurality of optical fibers disposed within the buffer tube;
    wherein the subunits are compressed against each other and against the interior of the subunit cable jacket such that the cross-sections of the subunits are generally oval, thereby facilitating a smaller nominal outside diameter of the subunit cable, wherein the subunits are compressed in the subunit cable jacket so that at least one of the subunits has a cross-section with a minor outside dimension and a major dimension, and the ratio of the minor outside dimension to the major outside dimension is less than 0.9, and wherein the nominal outside diameter of the subunit cable is less than 3.5 mm.

19. The cable of claim 18, further comprising a strain-relief component disposed within the subunit cable jacket, the strain-relief component comprising a plurality of longitudinally extending tensile yarns, and wherein portions of the tensile yarns contact the subunits and the subunit cable jacket.

20. The cable of claim 18, wherein the at least two subunits comprises a first subunit and a second subunit, wherein there is a corresponding optical fiber in the second subunit of identical color for each optical fiber in the first subunit, and wherein the first subunit comprises twelve optical fibers and the second subunit comprises twelve optical fibers.

* * * * *